March 29, 1938.   W. HIRCHE   2,112,289
COMPRESSION REFRIGERATING MACHINE WITH ELECTROMOTOR
Filed March 21, 1936
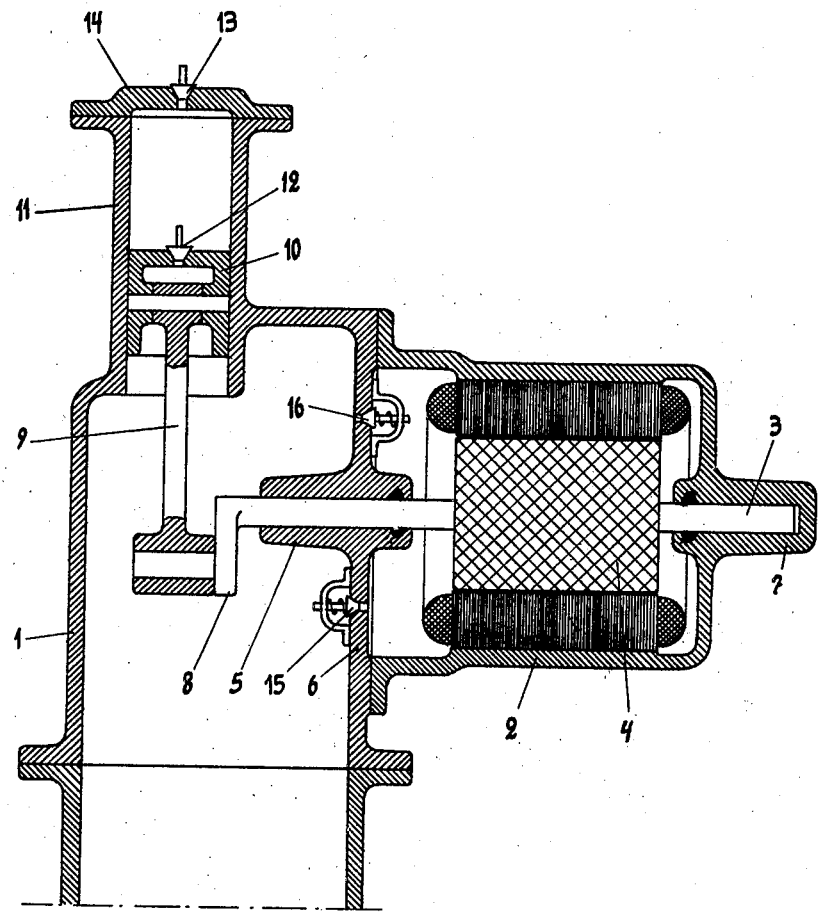

Patented Mar. 29, 1938

2,112,289

UNITED STATES PATENT OFFICE 2,112,289

COMPRESSION REFRIGERATING MACHINE WITH ELECTROMOTOR

Willy Hirche, Leopoldshain (Gorlitz-Land), Germany, assignor to Berlin-Suhler Waffen-und Fahrzeugwerke, G. m. b. H., Berlin, Germany Application March 21, 1936, Serial No. 70,167
In Germany March 22, 1935

1 Claim. (Cl. 230—58)

This invention relates to a compression refrigerating machine, in which the driving electric motor is coupled with the compressor shaft and accommodated in a casing gas-tightly packed against the atmospheric air. The novelty consists in that in the partition between the crank case and the motor housing two check valves are arranged, one of which opens towards the motor housing and the other towards the crank case. This novelty presents in comparison with the known construction the advantage that it permits of the simultaneous evacuating of the otherwise separated crank case and motor housing and admits subsequently a pressure equalization in crank case and motor housing, separating, however at normal working pressure, the motor housing gas-tightly from the crank case so that no wandering of the vapors and therefore, no transmission from the heat of the motor can take place, this latter inconvenience occurring in the known machines with permanently open communication between the crank case and motor housing.

An embodiment of the invention is illustrated, by way of example, in the only figure of the accompanying drawing in section.

The motor housing 2 packed gas-tightly against the atmosphere is connected with the crank case 1. The rotor 4 of the electric motor is mounted on the driving shaft 3 and journalled on a bearing 5 of wall 6 of the crank case and in a bearing 7 of the outer wall of the motor housing, this bearing being closed against the outer side. The driving shaft 3 ends in a crank 8 which, by means of a connecting rod 9 moves to and fro a piston 10 in a cylinder 11. Valves 12 and 13 in the piston and in the head 14 respectively regulate the passage of the vapors of the refrigerating medium delivered by the compressor to the condenser. Two spring-controlled check valves 15, 16 are mounted in the partition 6 between motor housing 2 and crank case 1, the valve 15 opening towards the crank case and that 16 towards the motor housing. The valve 15 operates for the first time during the evacuation of the refrigerating machine and serves otherwise, same as valve 16, to enable the pressure equalization between the crank case and the motor housing. The tension of the springs of valves 15, 16 is selected so that the valves remain inoperative at normal working pressure and open only when, for any reason, a higher over-pressure has been produced in the crank case or motor housing. No accidental wandering of the vapors of the refrigerating medium from the crank case into the motor housing, especially any escapement of the heat from the motor housing into the crank case, can therefore occur.

I claim:—

A compression refrigerating machine comprising in combination a compressor, a crank case carrying said compressor, a motor housing extending from said crank case, a crank shaft of said compressor in said crank case and extending into said motor housing, a motor in said housing connected to said crank shaft to drive said crank shaft, a partition between said crank case and said motor housing, and two check valves in said partition adapted to operate in opposite directions.

WILLY HIRCHE.